United States Patent [19]
Ono

[11] Patent Number: 5,797,621
[45] Date of Patent: Aug. 25, 1998

[54] AIRBAG CONFIGURATION FOR A SIDE AIRBAG DEVICE

[75] Inventor: Kazumi Ono, Saitama, Japan

[73] Assignee: Kansei Corporation, Japan

[21] Appl. No.: 856,626

[22] Filed: May 14, 1997

[30] Foreign Application Priority Data

May 17, 1996 [JP] Japan ................................. 8-123553

[51] Int. Cl.⁶ .................................................. B60R 21/22
[52] U.S. Cl. ........................... 280/730.2; 280/730.1; 280/743.1; 280/729
[58] Field of Search ........................... 280/730.2, 730.1, 280/743.1, 728.1, 729

[56] References Cited

U.S. PATENT DOCUMENTS 5,544,913  8/1996  Yamanashi et al. ................. 280/730.2
5,599,040  2/1997  Takahashi et al. ................... 280/729

FOREIGN PATENT DOCUMENTS 523704   1/1993  European Pat. Off. ............ 250/730.2
311930  12/1989  Japan ................................. 280/729
5-213138  8/1993  Japan.

Primary Examiner—Christopher P. Ellis
Attorney, Agent, or Firm—Morrison Law Firm

[57] ABSTRACT

An airbag for an airbag device includes a primary cloth and a secondary cloth constrainingly attached by way of least one tether strip. Primary cloth, secondary cloth, and reinforcement cloth are layered together. The edges of the primary cut cloth and the secondary cut cloth, and the reinforcement cloth except for a cut edge, are bonded together. By using the opening that results from the absence of bonding at the edge of the reinforcement cloth, an object comprised of the primary and the secondary cloths and the reinforcement cloth can be turned inside out by passing the primary and secondary cloths through the opening at the cut edge of the reinforcement cloth.

4 Claims, 3 Drawing Sheets

FIG. 6 PRIOR ART
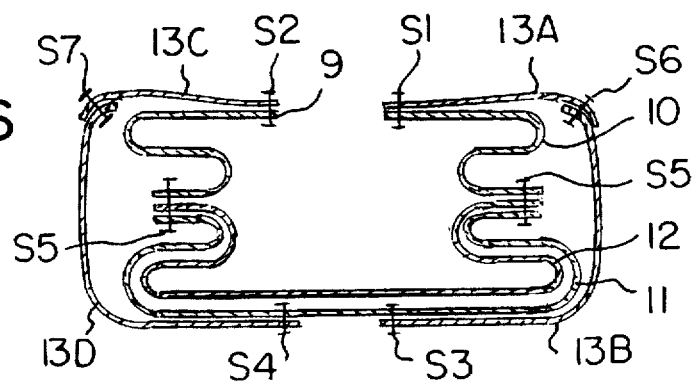
FIG. 7 PRIOR ART
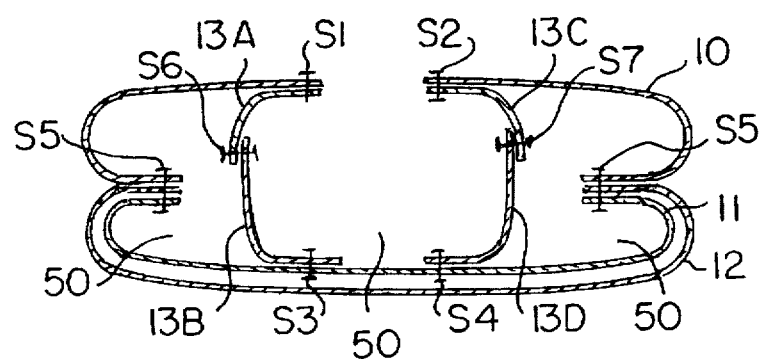
FIG. 8 PRIOR ART

AIRBAG CONFIGURATION FOR A SIDE AIRBAG DEVICE

BACKGROUND OF THE INVENTION

The present invention relates to an airbag configuration for a side airbag device. A side airbag is usually placed, as the name suggests, to the side of an automobile occupant, inside a door or a seat or the like. When an automobile receives an unusual impact force due to a side impact collision or the like, the side airbag expands between the inner side of the door and the passenger. The force of the potential impact to the passenger is substantially absorbed by the expansion of the airbag, thus protecting the passenger. Japanese laid open patent number 6227344, the entirety of which is incorporated herein by reference, demonstrates the configuration of one such side airbag device.

Referring to FIG. 8, an airbag of the prior art is shown inflated. According to the side airbag device of the prior art, when an automobile receives an impact force due to a collision or the like, an airbag 2 which was placed inside a side door 1 is inflated between side door 1 and a passenger 4 by the action of an inflator 3. Inflated airbag 2 absorbs and softens the impact force received by passenger 4 who is sitting in a seat 5.

However, if a window 6 shatters at the time of the automobile collision, there is danger of damage and rupture of expanded airbag 2 due to sharp broken glass of window 6. In order to prevent the rupture of airbag 2, a reinforcement cloth 7 made from a very tough cloth such as, for example, glass fiber, carbon fiber, liquid crystal fiber, alamide fiber, or the like is placed where the expanded airbag faces window 6.

Airbag 2 is inflated in the narrow space between passenger 4 and side door 1 by the action of inflator 3. In order to heighten the safety of passenger 4, the expanded shape of airbag 2 should be such that a wide area is covered to the side of passenger 4. Referring to FIG. 8, in order to satisfy this requirement, the shape of expanded airbag 2 must be maintained so that it has a flattened cross-sectional shape. In order for expanded airbag 2 to maintain this flattened cross-sectional shape, one or more tether strips are attached to the interior of airbag 2. This is a technology known from outside Japanese laid-open patent number 6-227344.

As discussed above, when the airbag for a side airbag device is being sewn, it is necessary to place a reinforcement cloth on the outer side of the airbag. It is also necessary to attach one or more short tether strips 8 inside the airbag in order to maintain the requisite flattened cross-sectional shape upon inflation. In the production by sewing of the airbag of the prior art, there are considerable difficulties in the sewing of reinforcement cloth 7 and tether strips 8 that raise the cost of production.

Referring to FIGS. 5 through 7, the process of making the prior art airbag is described. Sewing the airbag for a side airbag device of the prior art involves preparing a primary cloth 10 having an inflator attachment hole 9, a secondary cloth 11, and reinforcement cloth 12. Secondary cloth 11 and reinforcement cloth 12 are both cut to have the same contour as primary cloth 10. An even number of tether strip pieces 13A, 13B, 13C, 13D (in this example of the prior art, four tether strip pieces are used in order to attach tether strips at two locations) are formed. Referring to FIG. 5, one end of each tether strip pieces 13A and 13C is attached by sewing attachments S1 and S2 respectively to the desired location at each side of attachment hole 9 on primary cloth 10. Similarly, one end of each tether strip pieces 13B and 13D is attached by sewing attachments S3 and S4 to the required opposite location on secondary cloth 11.

Reinforcement cloth 12 is layered between primary cloth 10 and secondary cloth 11 which have tether strip pieces attached. Primary cloth 10, secondary cloth 11, and reinforcement cloth 12 are layered so that tether strip pieces sewn on to primary and secondary cut cloths 10, 11 face outward. As can be seen in FIG. 5, the edges of primary cloth 10, secondary cloths 11, and reinforcement cloth 12, are sewn together at sewing attachment S5.

Referring to FIG. 6, the free ends of tether strip pieces 13A, 13B and the free ends of tether strip pieces 13C, 13D are sewn together respectively at sewing attachments S6 and S7. The airbag created as above is next turned inside out using inflator attachment hole 9 formed in primary cloth 10.

The airbag of FIG. 6 is shown turned inside out in FIG. 7. As can be seen in FIG. 7, the seams formed from the edges of sewn together cloths at sewing attachments S3, S4, S6, and S7, from tether strip pieces 13A, 13B, 13C, 13D, and the seam from sewing attachment S5 are now positioned in the interior of the saclike sewn object made up of primary cloth 10 and secondary cloth 11. Reinforcement cloth 12 is now located on the outer side of this sewn object.

The expansion chamber 50 of the airbag is formed by primary cloth 10 and secondary cloth 11. The expansion chamber is constrained to the correct shape by tether strip pairs 13A and 13B, and 13C and 13D. The seams formed by sewing attachments S5 are necessarily inside expansion chamber 50 because expansion chamber 50 was formed by turning the sewn airbag inside out through inflator attachment hole 9.

As described above, in the manufacturing of an airbag configuration of a side airbag device of the prior art, the tether strip pieces have been divided into two beforehand. Tether strip pieces 13A, 13B and 13C, 13D are sewn onto primary cut cloth 10, and secondary cut cloth 11. Accordingly, a step of sewing together tether strip pieces 13A to 13B and 13C to 13D becomes necessary. Thus, the steps required are increased by the steps to sew the tether strip pieces to each other. Further, there is a limitation on the length of short tether strips, and sewing tether strips to each other can be difficult.

In the prior art, in order to hide the seam after primary and secondary cloths 10, 11, and reinforcing cloth 12 are sewn together, it is necessary to turn the resulting sewn object of 10, 11, and 12, inside out. This turning inside out relies on inflator attachment hole 9 on primary cloth 10 which has a small radius. As a result, the operation of turning inside out becomes extremely difficult. Therefore, there are many disadvantages to the prior art in terms of operation and production.

OBJECTS AND SUMMARY OF THE INVENTION

It is an object of the present invention to overcome the limitations of the prior art.

The present invention focuses on the disadvantages of the prior art. The object of the present invention is to simplify and facilitate the sewing process of the tether strip inside the airbag.

A further object of the present invention is to improve the production and economy of the airbag for the side airbag device by making easier the operation of inverting the sewn object of the primary and secondary cut cloths and reinforcement cloths.

In order to achieve the above objectives, the present invention according to one embodiment is an airbag configuration for a side airbag device comprising a primary cloth with an inflator attachment hole, a secondary cloth having the same contour as the primary cloth, a reinforcement cloth having the same contour as the primary and secondary cloths for part of the reinforcement's perimeter, but for the remaining other part of its perimeter the reinforcement cloth is made smaller than the primary and secondary cloths by having a cut edge; at least one tether strips; primary and secondary cloths are attached apart from each other by the tether strips; the primary cloth, the secondary cloth, and the reinforced cloth are layered on top of each other; the edges of the primary cloth and the secondary cloth and the reinforcement cloth, except for the cut edge, are sewn together; by using the opening that results from the absence of sewing at the cut edge of the reinforcement cloth, a sewn object formed of the primary and the secondary cloths and the reinforcement cloth can be turned inside out.

Briefly stated, an airbag for an airbag device includes a primary cloth and a secondary cloth constrainingly attached by way of at least one tether strip. Primary cloth, secondary cloth, and reinforcement cloth are layered together. The edges of the primary cut cloth and the secondary cut cloth, and the reinforcement cloth except for a cut edge, are bonded together. By using the opening that results from the absence of bonding at the cut edge of the reinforcement cloth, an object comprised of the primary and the secondary cloths and the reinforcement cloth can be turned inside out by passing the primary and secondary cloths through the opening at the cut edge of the reinforcement cloth.

According to an embodiment of the present invention, an airbag configuration for an airbag device comprises a primary cloth having an inflator attachment hole and an outer perimeter contour, a secondary cloth having substantially the perimeter contour, the primary cloth and the secondary cloth connected effective to form an expansion chamber, at least one tether strip attached at one end to the primary cloth and at an opposite end to the secondary cloth, in the expansion chamber, a reinforcement cloth having a perimeter including a major portion and a remaining minor portion, the major portion following the perimeter contour, the remaining minor portion formed by a diverging edge from the perimeter contour, and the reinforcement cloth connected to the expansion chamber proximate to the major portion.

According to an embodiment of the present invention, an airbag configuration for an airbag device comprises a primary cloth having an inflator attachment hole and an outer perimeter contour, a secondary cloth having substantially the perimeter contour, at least one tether strip attached at one end to the primary cloth and at an opposite end to the secondary cloth, a reinforcement cloth having a perimeter including a major portion and a remaining minor portion, the major portion following the perimeter contour, the remaining minor portion formed by a diverging edge from the perimeter contour, the secondary cloth, the primary cloth, and the reinforcement cloth in a stacked arrangement, with the primary cloth between the secondary cloth and the reinforcement cloth, and the stacked arrangement connected at a seam formed proximate to the perimeter contour.

According to an embodiment of the present invention, an airbag configuration for an airbag device comprises a primary cloth having an inflator attachment hole and an outer edge having a perimeter contour, a secondary cloth having an outer edge having substantially the perimeter contour, the primary cloth and the secondary cloth connected at their respective outer edges to form a seam effective to form an expansion chamber, at least one tether strip attached at one end to the primary cloth and at an opposite end to the secondary cloth, in the expansion chamber, a reinforcement cloth having an outer edge having a perimeter including a major portion and a remaining minor portion, the major portion following the perimeter contour, the remaining minor portion formed by a diverging edge from the perimeter contour, the reinforcement cloth connected, at the major portion, to the expansion chamber at the seam to form a compartment having an opening at the diverging edge, and the outer edge of the primary cloth and the outer edge of the secondary cloth are in the compartment, and the major portion of the outer edge of the reinforcement cloth is in the compartment.

According to an embodiment of the present invention, a method to make an airbag for an airbag device, the method comprises the steps of forming an expansion chamber and a compartment from a primary cloth, a secondary cloth, and a reinforcement cloth, wherein the expansion chamber is formed by the primary cloth and the secondary cloth, and wherein the compartment is formed by the primary cloth and the reinforcement cloth, and passing the expansion chamber through an opening in the compartment.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 6 is a descriptive cross-sectional drawing which shows a sewing step of the same airbag of the prior art.

FIG. 7 is a descriptive cross-sectional drawing which shows the completed state of the same airbag of the prior art.

FIG. 8 is a descriptive drawing showing the side airbag device of the prior art when it is in use in an automobile.

DETAILED DESCRIPTION OF THE PREFERRED EMBODIMENT

Figure 1:
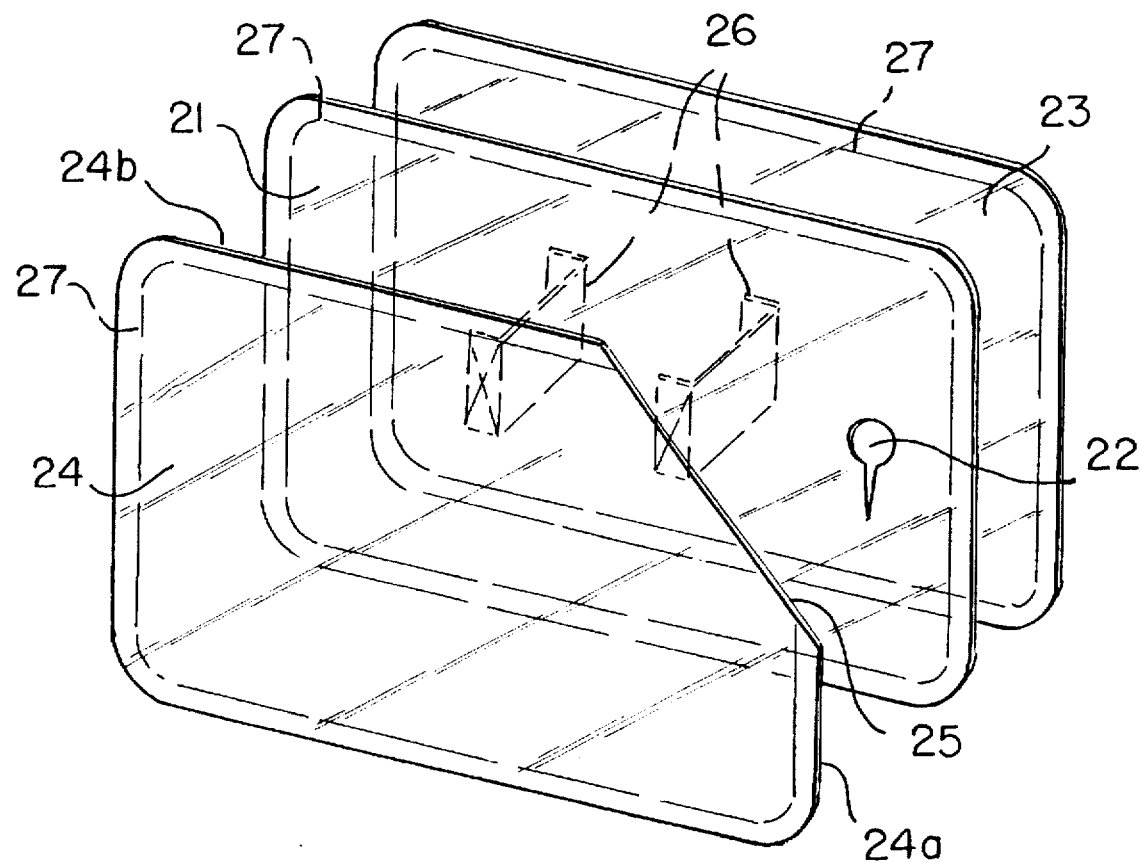
FIG. 1 is a descriptive perspective drawing of the cloth materials for an airbag for a side airbag device of the present invention.

Referring to the drawings, the present invention will be described in detail.

Referring to FIG. 1, there is shown a perspective drawing of the cloth materials of the present embodiment prior to sewing. A primary cloth 21 is made from a cut cloth for assembling the airbag. An inflator attachment hole 22 is pierced in primary cloth 21. A secondary cloth 23 is formed with substantially the same contour as primary cloth 21. There is a reinforcement cloth 24. Primary cloth 21 and secondary cloth 22 is made from any flexible sheet material suitable for forming airbags. Reinforcement cloth 24 is made from any suitable flexible sheet material for physical reinforcement or protection of airbags. Although the production is described herein as by sewing, other assembly processes can be used such as, for example, gluing, heat sealing, melt bonding, and adhesive strips.

A portion of the contour of reinforcement cloth 24 matches primary and secondary cloths 21 and 23. In order to make the other remaining portion of the reinforcement cloth 24 contour smaller than the contour of primary and secondary cloths 21 and 23, cut edge 25 is created by making a diagonal cut from side 24a to an adjacent side 24b. The cut edge is not limited to the above shape. For example, a rectangularly shaped cut or a semicircularly shaped cut can be made. The purpose of the cut is to allow easy inverting of the sewn airbag of the present invention by turning the sewn airbag inside out through the opening formed by cut edge 25.

There is at least one ribbon-shaped tether strip 26. In the present embodiment, there are shown tether strips at two locations, but there can be more than 2 locations.

The assembly process of the airbag using the above cloth materials will now be described.

One end of each tether strip 26 is sewn on to primary cloth 21 at appropriate locations at sewing attachment S10. The other end of each tether strip 26 is sewn on to secondary cloth 23 at sewing attachment S11. Primary and secondary cloths 21 and 23 are connected approximately parallel by way of tether strip 26.

Figure 2:
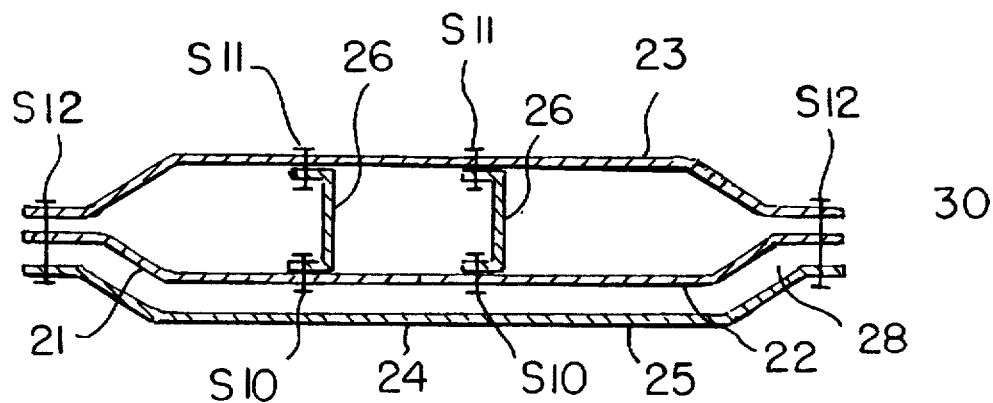
FIG. 2 is a cross-sectional drawing of the sewn state of the same airbag of the present invention before turning inside out.

Reinforcing cloth 24 is laid on the surface of primary cut cloth 21. Referring to FIG. 2, the three cloths of reinforcement cloth 24, primary cloth 21, and secondary cloth 23 are sewn together at sewing attachment S12 along a seam 27 that follows the edges of primary cloth 21 and secondary cloth 23. Since sewing attachment S12 takes place along the edges of primary and secondary cut cloths 21, 23, the cut edge 25 on reinforcement cloth 24 is not sewn together because cut edge 25 diverges away from seam 27. As a result, an opening 28 is formed by cutting edge 25.

The size of opening 28 is determined by controlling the length or the shape of cut edge 25 created on the above reinforcement cloth 24. Opening 28 should be formed for ease of turning the formed airbag inside out.

Figure 3:
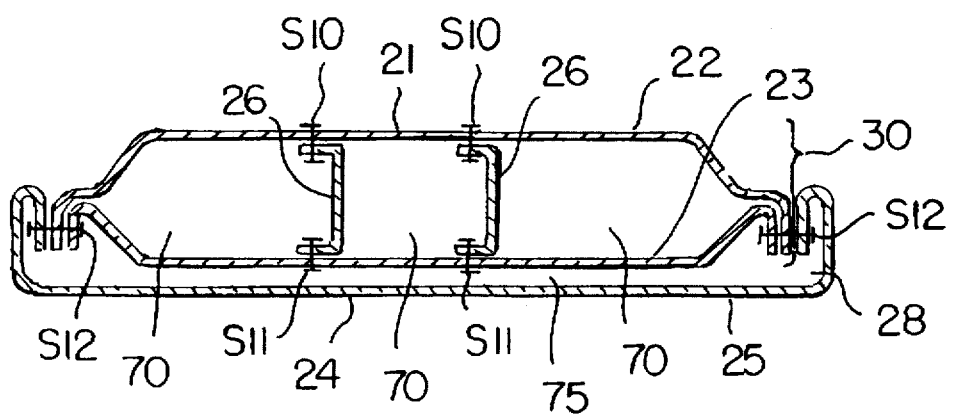
FIG. 3 is a cross-sectional drawing of the completed turned inside out state of the same airbag of the present invention.
Figure 4:
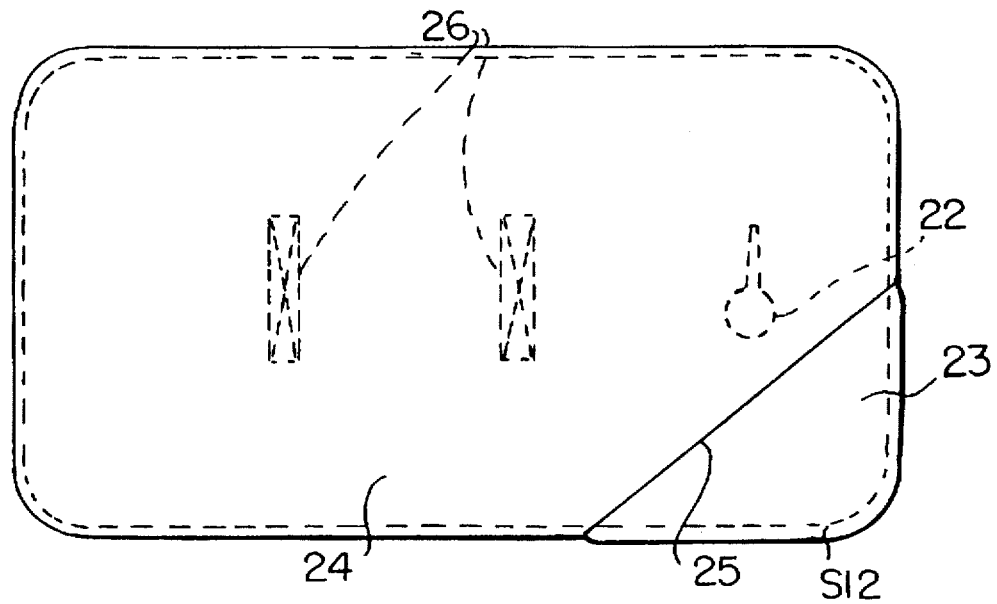
FIG. 4 is a side view of the completed state of the same airbag of the present invention.
Figure 5:
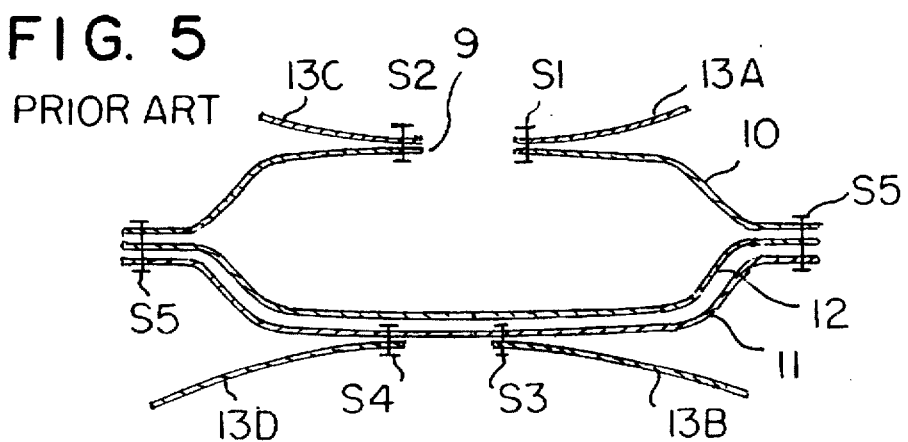
FIG. 5 is a descriptive cross-sectional drawing which shows a sewing step of an airbag of a side airbag device of the prior art.

Referring to FIG. 2, sewn object 30 comprised of primary and secondary cut cloths 21 and 23, is turned inside out through opening 28 in reinforcing cloth 24. Referring to FIG. 3, practically all of the seam created by sewing attachment S12 is hidden in the interior compartment 75 between sewn object 30 and reinforcement cloth 24. The seam created by sewing attachment S12 is not in expansion chamber 70 because the airbag is not turned inside out through inflator attachment hole 22. The airbag is completed.

By hiding the seam inside compartment 75 between sewn body 30 and reinforcing cloth 24, when the compactly folded airbag is opened by the action of the inflator, the chance of the seams of the cloths becoming caught is eliminated. As a result, the reliability of the opening operation of the airbag is improved further.

By the present embodiment, it is easy to attach the required number of tether strips 26 between primary cut cloth 21 and secondary cut cloth 23. The sewing operation of tether strips 26 is much improved.

Opening 28 can be made bigger depending on the length of cut edge 25. As a result the operation of inverting sewn object 30 and reinforcement cloth 24 becomes much easier.

With the present invention the attachment of tether strips is made easy. Furthermore, the inverting operation where the seam around the sewn object is brought to the interior is made extremely easy. An airbag for a side airbag device which is high in productivity and profitability can thus be obtained.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

Although only a single or few exemplary embodiments of this invention have been described in detail above, those skilled in the art will readily appreciate that many modifications are possible in the exemplary embodiment (s) without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures. This although a nail and screw may not be structural equivalents in that a nail relies entirely on friction between a wooden part and a cylindrical surface whereas a screw's helical surface positively engages the wooden part in the environment of fastening wooden parts, a nail and a screw may be equivalent structures.

What is claimed is:

1. An airbag configuration for an airbag device comprising:

a primary cloth having an inflator attachment hole and an outer perimeter contour;

a secondary cloth having substantially said perimeter contour, said primary cloth and said secondary cloth connected effective to form an expansion chamber;

at least one tether strip attached at one end to said primary cloth and at an opposite end to said secondary cloth, in said expansion chamber;

a reinforcement cloth having a perimeter including a major portion and a remaining minor portion, said major portion following said perimeter contour, said remaining minor portion formed by a diverging edge from said perimeter contour; and said reinforcement cloth connected to said expansion chamber proximate to said major portion.

2. An airbag configuration for an airbag device comprising:

a primary cloth having an inflator attachment hole and an outer perimeter contour;

a secondary cloth having substantially said perimeter contour, at least one tether strip attached at one end to said primary cloth and at an opposite end to said secondary cloth;

a reinforcement cloth having a perimeter including a major portion and a remaining minor portion, said major portion following said perimeter contour, said remaining minor portion formed by a diverging edge from said perimeter contour;

said secondary cloth, said primary cloth, and said reinforcement cloth in a stacked arrangement, with said primary cloth between said secondary cloth and said reinforcement cloth; and said stacked arrangement connected at a seam formed proximate to said perimeter contour.

3. An airbag configuration for an airbag device comprising:

a primary cloth having an inflator attachment hole and an outer edge having a perimeter contour;

a secondary cloth having an outer edge having substantially said perimeter contour, said primary cloth and said secondary cloth connected at their respective outer edges to form a seam effective to form an expansion chamber;

at least one tether strip attached at one end to said primary cloth and at an opposite end to said secondary cloth, in said expansion chamber;

a reinforcement cloth having an outer edge having a perimeter including a major portion and a remaining minor portion, said major portion following said perimeter contour, said remaining minor portion formed by a diverging edge from said perimeter contour;

said reinforcement cloth connected, at said major portion, to said expansion chamber at said seam to form a compartment having an opening at said diverging edge; and said outer edge of said primary cloth and said outer edge of said secondary cloth are in said compartment, and said major portion of said outer edge of said reinforcement cloth is in said compartment.

4. A method to make an airbag for an airbag device, said method comprising the steps of:

forming an expansion chamber and a compartment from a primary cloth, a secondary cloth, and a reinforcement cloth, wherein said expansion chamber is formed by said primary cloth and said secondary cloth, and wherein said compartment is formed by said primary cloth and said reinforcement cloth; and passing said expansion chamber through an opening in said compartment.

* * * * *